July 16, 1946.　　　G. O. POTTER　　　2,404,249
FISH SPEAR
Filed Oct. 6, 1944
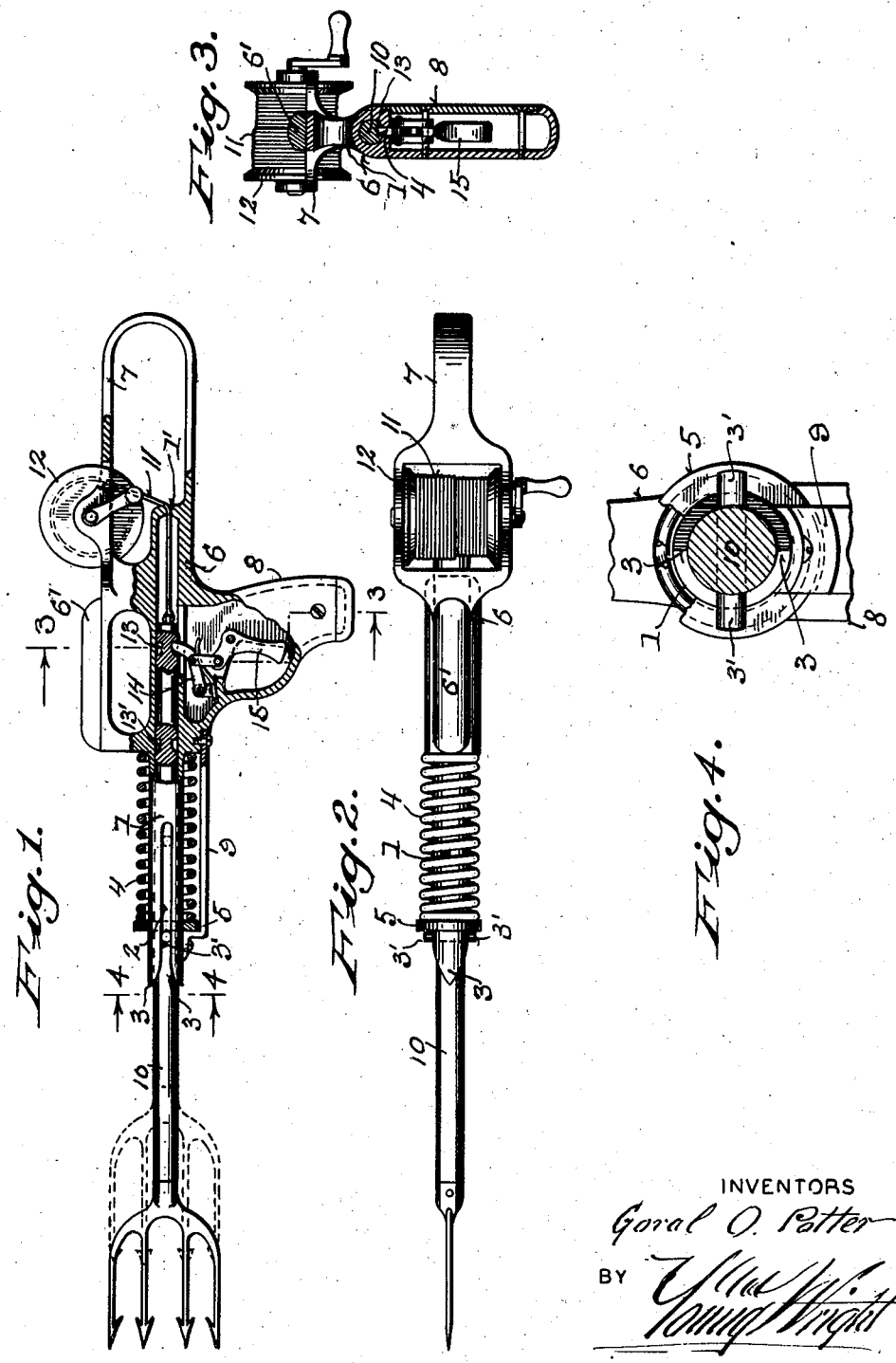
INVENTORS
Goral O. Potter
BY
Young Wright
ATTORNEYS Patented July 16, 1946

2,404,249

UNITED STATES PATENT OFFICE 2,404,249

FISH SPEAR

Goral O. Potter, Waubun, Minn., assignor of one-half to Loyd Roy, Mahnomen, Minn.

Application October 6, 1944, Serial No. 557,417

1 Claim. (Cl. 43—6)

My invention refers to fish spears and it has for its object to provide a simple and effective power driven harpoon gun, wherein the power is readily released and loaded.

The specific object of my invention is to provide a spear receiving slotted barrel adapted to automatically engage a spear pin for loading a spring associated with the barrel.

With the above and other minor objects in view, my invention consists in certain peculiarities of construction and combination of parts as will be fully set forth hereinafter with reference to the accompanying drawing and subsequently claimed.

In the drawing:

Figure 1 represents a side elevation of a spear embodying the features of my invention, with parts broken away and in section to more clearly illustrate structural features.

Figure 2 a top plan view of the same.

Figure 3 a cross section of the fish spear, the section being indicated by line 3—3 of Figure 1, and Figure 4 an enlarged detail cross sectional view with parts broken away, as indicated on line 4—4 of Figure 1.

Referring by characters to the drawing, 1 indicates a gun barrel provided with companion slots 2 at its discharge end, the slots terminating with flared pointed cams 3.

Mounted upon the gun barrel is a coil spring 4 interposed between a sliding washer 5 and a shoulder extending from the barrel which forms part of the gun stock 6. The gun stock carries an auxiliary handle 6' and terminates rearwardly with a loop 7. The stock carries a hollow pistol grip 8 and a guard 9 for the coil spring.

Mounted in the bore of the gun barrel is a shaft 10 of a multiple pronged spear head. The end of the spear head has connected thereto a line 11, which line passes through the rear opening 1' of the gun barrel and from said opening the line is trained over a reel 12 journaled upon the loop 7 of the gun stock.

The spear shaft, adjacent its rear end, is provided with a safety notch 13 and a loading notch 13' for engagement with a spring controlled dog 14, released by a trigger 15 pivotally mounted in the pistol grip handle 8.

From the foregoing description it will be noted that the spear shaft, as shown in Figure 1, is locked within the barrel by engagement of the notch 13 and dog 14.

When it is desired to load the gun for firing, the spear shaft is pushed inwardly and a pin 3' carried thereby fully compresses the coil spring. To discharge the gun, when the same is properly aimed, the trigger 15 is actuated, whereby the shaft of the spear is discharged at the fish, it being noted that the line, for recovering the spear, will play outwardly.

The spear is retrieved by winding the line upon the reel, and when the end of said spear reaches the mouth of the gun, the pin 3', carried by the spear, will contact with the nose of the cam 3, whereby said pin will enter the slot 2 in position to engage the washer 5 when it is desired to load the coil spring.

While I have described one exemplification of my invention minutely as to detail, it is understood that I may vary structural features within the scope of the claim.

I claim:

A harpoon gun comprising an open ended barrel having a slot in its discharge end terminating with a cam guide, a spear headed shaft adapted to fit into the bore of the gun barrel, the shaft being provided with a locking notch in its rear end portion, a pin projecting from the shaft engageable with the barrel slot, a coil spring carried by said barrel engageable with the shaft pin for compressing the spring, a reel mounted upon the barrel stock, a line carried by the reel connected to the rear end of the spear shaft, and a trigger controlled lock and release dog engageable with the said spear shaft notch.

GORAL O. POTTER.